US011625086B2

(12) United States Patent
Lagnado et al.

(10) Patent No.: US 11,625,086 B2
(45) Date of Patent: Apr. 11, 2023

(54) POWER REDUCTION MODES FOR WIRELESS DEVICES TO REDUCE ABSORPTION RISK TO USERS

(71) Applicant: Hewlett-Packard Development Company, L.P., Spring, TX (US)

(72) Inventors: Isaac Lagnado, Spring, TX (US); Chih-Hung Chien, Taipei (TW); Danny Farnyih Meng, Spring, TX (US); Steven Petit, Spring, TX (US)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 9 days.

(21) Appl. No.: 17/361,908

(22) Filed: Jun. 29, 2021

(65) Prior Publication Data

US 2022/0413587 A1    Dec. 29, 2022

(51) Int. Cl.
  *G06F 1/3234* (2019.01)
  *G06F 1/3209* (2019.01)
  *H04W 52/28* (2009.01)

(52) U.S. Cl.
  CPC .......... *G06F 1/3234* (2013.01); *G06F 1/3209* (2013.01); *H04W 52/28* (2013.01)

(58) Field of Classification Search
  CPC ..... G06F 1/3234; G06F 1/3209; H04W 52/28
  USPC ........................................................ 713/310
  See application file for complete search history.

(56) References Cited

U.S. PATENT DOCUMENTS

| 8,515,488 | B2 | 8/2013 | Hillier | |
| 9,392,320 | B1* | 7/2016 | Damle | ............... H04N 21/4424 |
| 2002/0152408 | A1* | 10/2002 | Inui | ...................... G06F 1/3215 |
| | | | | 713/300 |
| 2010/0008484 | A1 | 1/2010 | Abrahamsson | |
| 2012/0258772 | A1* | 10/2012 | Brogle | ................... H01Q 21/28 |
| | | | | 455/556.1 |
| 2014/0038656 | A1* | 2/2014 | Navda | ................... H04W 24/10 |
| | | | | 455/509 |
| 2014/0094150 | A1 | 4/2014 | Huang | |
| 2014/0115514 | A1* | 4/2014 | Hackborn | ............... H04W 4/00 |
| | | | | 715/771 |
| 2018/0234787 | A1 | 8/2018 | Karimli | |
| 2018/0279221 | A1 | 9/2018 | Fuleshwar Prasad | |
| 2020/0301575 | A1* | 9/2020 | Lindholm | .......... H04N 21/4722 |
| 2020/0322393 | A1* | 10/2020 | Zhu | ..................... H04L 65/1104 |
| 2021/0216428 | A1* | 7/2021 | Thompson | ............ G06F 1/3206 |

FOREIGN PATENT DOCUMENTS

CN          104955139 A  *  9/2015

* cited by examiner

*Primary Examiner* — Chun Cao
(74) *Attorney, Agent, or Firm* — Knobbe, Martens, Olson & Bear, LLP

(57) ABSTRACT

In some examples, the disclosure describes a device, comprising: a processor, and a non-transitory memory resource storing machine-readable instructions stored thereon that, when executed, cause the processor to: activate a dynamic power reduction mode for a device in response to identifying the device is in a first power state associated with a first account, and deactivate the dynamic power reduction mode for the device in response to identifying the device is in a second power state associated with a second account.

9 Claims, 5 Drawing Sheets

POWER REDUCTION MODES FOR WIRELESS DEVICES TO REDUCE ABSORPTION RISK TO USERS

BACKGROUND

Wireless computing devices are subject to Specific Absorption Rate (SAR) limits in many countries to ensure that device users are not exposed to unacceptable irradiation levels. SAR can depend on a number of aspects including, for example, the position and orientation of the device relative to the user. For example, computing devices can operate in a number of orientations, including, laptop mode, tablet mode, and tent mode, among other orientations.

DETAILED DESCRIPTION

Figure 1:
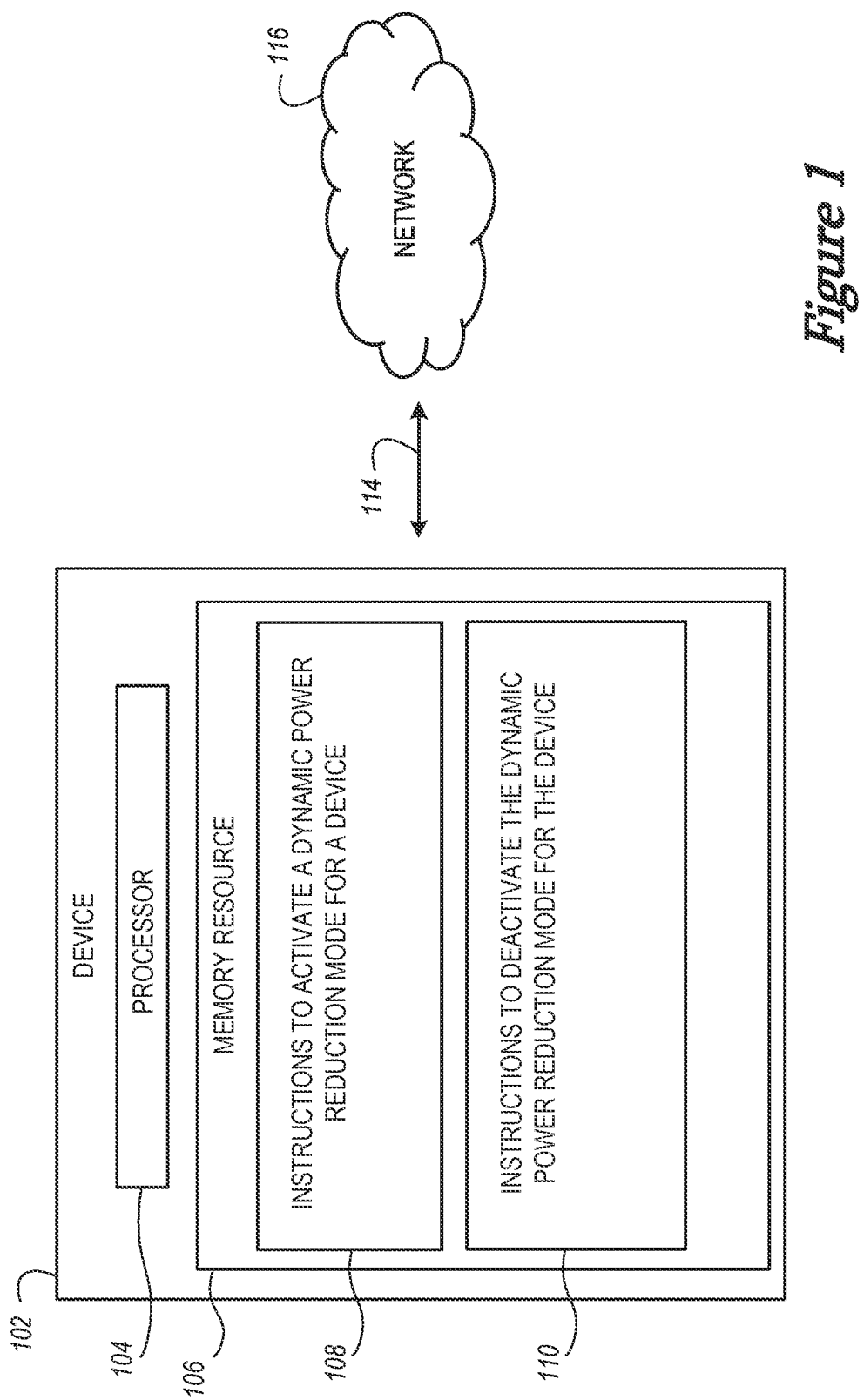
FIG. 1 illustrates an example of a computing device for altering between power reduction modes.

A user may utilize a computing device for various purposes, such as for business and/or recreational use. As used herein, the term computing device refers to an electronic device having a processor and a memory resource. Examples of computing devices can include, for instance, a laptop computer, a notebook computer, a desktop computer, and/or a mobile device (e.g., a smart phone, tablet, personal digital assistant, smart glasses, a wrist-worn device, etc.), among other types of computing devices.

In some examples, the computing device can include a radio device. As used herein, a radio can include a device that can generate and/or receive radio waves or other types of wireless signals. In some examples, the generated radio waves or wireless signals can correspond to a specific absorption rate (SAR) risk to a user of the computing device. In some examples, the SAR risk to a user can correspond to a proximity of the user to the computing device and/or a power level of the radio (e.g., quantity of radio waves generated, frequency of radio waves generated, etc.).

As such, controlling radio frequency (RF) power can mitigate SAR risks to users of the computing device. In some examples, the RF power may correspond to a particular SAR level. For example, a relatively higher RF power for a radio can correspond to relatively higher SAR risk level to a user and a relatively lower RF power for a radio can correspond to a relatively lower SAR risk level to a user. Therefore, the RF power may need to be reduced based on the use or proximity of a user to lower risk to the user. For example, a radio module in a dynamic power reduction (DPR) mode can use a DPR table to determine how much the RF power is reduced to mitigate the SAR risk to the user of the computing device. A DPR table can indicate how much the RF power can be reduced based on the frequency to mitigate the SAR risk.

The present disclosure relates to altering the DPR mode of the radio and/or computing device based on a current mode or account that is activated for the computing device. In some examples, the computing device can be utilized in a user mode when a user is interacting with the computing device. In some examples, the user mode can correspond to when a user is physically proximate to the computing device and/or utilizing a user interface or operating system associated with the computing device. In some examples, the mode of the computing device can be based on a power state of the computing device. For example, when the computing device is in a S0 power state, the user mode of the computing device can be activated. In other examples, the computing device can be remotely managed or monitored by a management device. In these remote management examples, the management device can utilize the computing device as an internet of things (IoT) device. When the management device is utilizing the computing device as an IoT device, the computing device can be operating in an IoT mode. In some examples, the power state of the computing device can be utilized to alter from the user mode to the IoT mode. For example, the IoT mode can be activated when the computing device is in a S3, S4, and/or S5 power state.

In some examples, the computing device can switch between the IoT mode and the user mode based on user interactions with the computing device. In some examples, the same radio can be utilized to provide both a connection with a network for the IoT mode and the user mode. In this way, a power mode (e.g., dynamic power reduction mode, etc.) of the radio can be altered in response to the mode of the computing device. In this way, a user of the computing device can be protected from SAR risk when utilizing the computing device when the radio is in a first mode while the management device can utilize the computing device as an IoT device in a second mode.

FIG. 1 illustrates an example of a device 102 for altering between power reduction modes. The device 102 can be utilized to alter dynamic power reduction settings for a computing device or the device 102. In some examples, the device 102 can be utilized in multiple modes that can be associated with different SIM accounts. For example, the device 102 can operate in a user mode associated with a user SIM account and can operate in an IoT mode associated with a IoT SIM account. In this example, the device 102 can activate the dynamic power mode during the user mode and deactivate the dynamic power mode during the IoT mode.

In some examples, the device 102 can include instructions to determine when the device 102 establishes a network connection. As used herein, the network connection can be a connection between the device 102 and a network 116 through a communication path 114. In some examples, a network connection can include a communication path, such as communication path 114 between the device 102 and a remote computing device or remote management device. As used herein, the network 116 can include a local area network (LAN), wide area network (WAN), Internet, or other type of network that can allow the device 102 communicate with remote devices.

In some examples, the device 102 can determine when the network connection is established based on an activation of a radio. As used herein, a radio can be a device that can transmit radio waves that can be utilized to transmit wireless signals for communicating with remote devices. In some examples, the device 102 can determine when the radio is activated or turned on (e.g., provided electrical power, etc.). As described herein, the radio waves generated by the radio can create a risk to a user that is proximate to the device 102. In this way, the device 102 can monitor a status of the radio to determine when the radio is activated and when the radio is deactivated.

In some examples, the device 102 can determine that the network connection has been established based on a quantity of uploads and/or a quantity of downloads utilizing a radio. For example, the device 102 can determine a power mode of the device 102 and a corresponding quantity of uploads and/or quantity of downloads can be determined. In this way, the device 102 can determine a power mode of the device 102 and determine an expected quantity of uploads and/or quantity of downloads based on the power mode of the device 102.

In some examples, the device 102 can include instructions 108 to activate a dynamic power reduction mode for a device in response to identifying the device is in a first power state associated with a first account. As described further herein, the power state of the device 102 can be utilized to identify a corresponding mode of the device. For example, the device 102 can be in a first power state (e.g., S0 power state, etc.) and activate a first mode (e.g., user mode, etc.) and can be in a second power state (e.g., S3, S4, S5 power state, etc.) and activate a second mode (e.g., IoT mode, etc.). In some examples, the first mode and the second mode can be associated with separate subscriber identification module (SIM) accounts.

In some examples, the first account is a first SIM account associated with the device. In some examples, the first account can be separate and distinct from a second account that is a second SIM account associated with the device. In some examples, the device 102 can activate the first account in response to a determination that the device 102 is in the first power state and to activate the second account in response to a determination that the device 102 is in the second power state. For example, the first account could be associated with a user mode and the second account could be associated with an IoT mode.

In some examples, the device 102 can determine that a user is utilizing the device 102. In some examples, the device 102 can determine that an operating system of the device 102 is being utilized. In some examples, the device 102 can determine that the device 102 is in a user mode when the operating system of the device 102 is being utilized. In this way, the device 102 can determine that when the operating system of the device 102 is being utilized or activated that the user is utilizing the device 102.

In some examples, the device 102 can utilize a number of different approaches to determine when a user is utilizing the device 102. In these examples, the device 102 can determine that the device 102 is in a user mode when the device 102 determines that a user associated with the device 102 is utilizing the device 102. In this way, the user mode can be initiated and the first dynamic power reduction mode can be activated. In some examples, the first dynamic power reduction mode can correspond to the user mode and/or correspond to when the device 102 determines that a user is utilizing the device 102. In these examples, the first dynamic power reduction mode can an activated dynamic power reduction mode that can lower a power of the radio to lower an SAR risk of a user that is proximate to the device 102. As used herein, the dynamic power reduction mode can be a process of altering a RF power of the radio of the device 102 to lower or mitigate the SAR risk to the user.

In some examples, the dynamic power reduction can utilize a DPR table that can include a plurality of RF power levels for the radio. In some examples, the DPR table can indicate the RF power of the radio that causes an acceptably low SAR (e.g., SAR level identified by an agency to be an acceptable SAR level, etc.) for the user. For example, the RF power of the radio can be altered to the RF power that the DPR table identifies as causing an acceptable low SAR for the user when the device 102 is in the user mode.

In some examples, the device 102 can include instructions 110 to deactivate the dynamic power reduction mode for the device 102 in response to identifying the device is in a second power state associated with a second account. As described herein, the second power state can correspond to the second account. For example, the second power state can be a low power state or a sleep state of the device 102. In this example, the device 102 can activate the IoT account and deactivate the power reduction mode for the device 102 such that the remote management device can utilize the device 102 as an IoT device. In other examples, the dynamic power reduction mode for the IoT mode can be set to a different level then the user mode. In these examples, the user mode dynamic power reduction mode can be a higher power due to a lower duty cycle and average transmission power expected during the IoT mode. As described herein, the second account can be associated with a remote management device that utilizes the device 102 as an IoT device to access performance metric data stored by the device 102. As used herein, a duty cycle of a radio can include a cycle of activation and deactivation. For example, the duty cycle of a radio can include a period of time that includes a portion of active transmissions and a portion of little or no transmissions. In this way, a relatively higher duty cycle can include a larger quantity of transmissions compared to a lower duty cycle.

In some examples, the remote management device can be a computing device that can manage and/or monitor the performance status of the device 102. In some examples, the remote management device can utilize the network 116 and/or communication path 114 to communicate with the device 102. In some examples, the radio of the device 102 can be utilized by the remote management device to communicate with the device 102.

As used herein, an IoT device can be part of an IoT system of devices that can be internet-connected objects that are able to collect and/or transfer data over a wireless network 116 without human intervention. In this way, a first IoT device can send or receive data with a second IoT device without human intervention or instructed by a human user. In this way, the remote management device can access the device 102 as if the device 102 were an IoT device when the device 102 is in an IoT mode utilizing the IoT account associated with a separate SIM account than the user account. As used herein, an IoT mode can be a mode when the device 102 determines that a user is not utilizing the device 102.

In some examples, the radio of the device 102 can be activated, but the radio of the device 102 can be utilized by the remote management device to extract or receive data from the device 102. In this way, the remote management device can utilize the device 102 as an IoT device to collect information related to the device 102. In a similar way, the management device can be utilized to provide data or information to the device 102 when the device is in the IoT mode utilizing the radio. In some examples, the same radio can be utilized during the IoT mode and the user mode, but during the IoT mode the device can activate the second dynamic power reduction mode. In this way, the same radio can be utilized for both the user SIM account and the IoT SIM account.

In some examples, the dynamic power reduction can be deactivated based on the interaction to be performed by the remote management device on the device 102. For example, the remote management device can be connecting to the device 102 through the network 116 to extract performance data from the device 102 and/or instruct the device 102 to send the performance data to the remote management device. In this example, the quantity or power of radio waves (e.g., average quantity of radio waves, average power of radio waves, etc.) generated by the radio can be predicted and a corresponding level of dynamic power reduction can be selected as the second dynamic power reduction mode or the dynamic power reduction can be deactivated. In this way, even when human users are proximate to the device 102 the dynamic power reduction can be activated at a lower level to mitigate or eliminate the SAR to a human user based on the interaction between the remote management device and the device 102.

The device 102 can be a computing device that can be utilized as a personal computing device for a human user. In these examples, the human user can utilize the device 102 through a user interface or similar application. In some examples, the device 102 can include a radio that can generate radio waves to establish a communication path 114 with a network 116. The radio can be altered between a plurality of dynamic power reduction modes based on whether the human user is utilizing the device or when the device 102 is acting as an IoT device.

In some examples the device 102 can be a computing device that can include a processor 104 communicatively coupled to a memory resource 106. As described further herein, the memory resource 106 can include instructions 108, 110 that can be executed by the processor 104 to perform particular functions. In some examples, the device 102 can include a radio to communicatively couple the device 102 to a network 116 through a communication path 114.

The device 102 can include components such as a processor 104. As used herein, the processor 104 can include, but is not limited to: a central processing unit (CPU), an application specific integrated circuit (ASIC), a field programmable gate array (FPGA), a metal-programmable cell array (MPCA), a semiconductor-based microprocessor, or other combination of circuitry and/or logic to orchestrate execution of instructions 108, 110. In other examples, the computing device 102 can include instructions 108, 110, stored on a machine-readable medium (e.g., memory resource 106, non-transitory computer-readable medium, etc.) and executable by a processor 104. In a specific example, the computing device 102 utilizes a non-transitory computer-readable medium storing instructions 108, 110, that, when executed, cause the processor 104 to perform corresponding functions.

Figure 2:
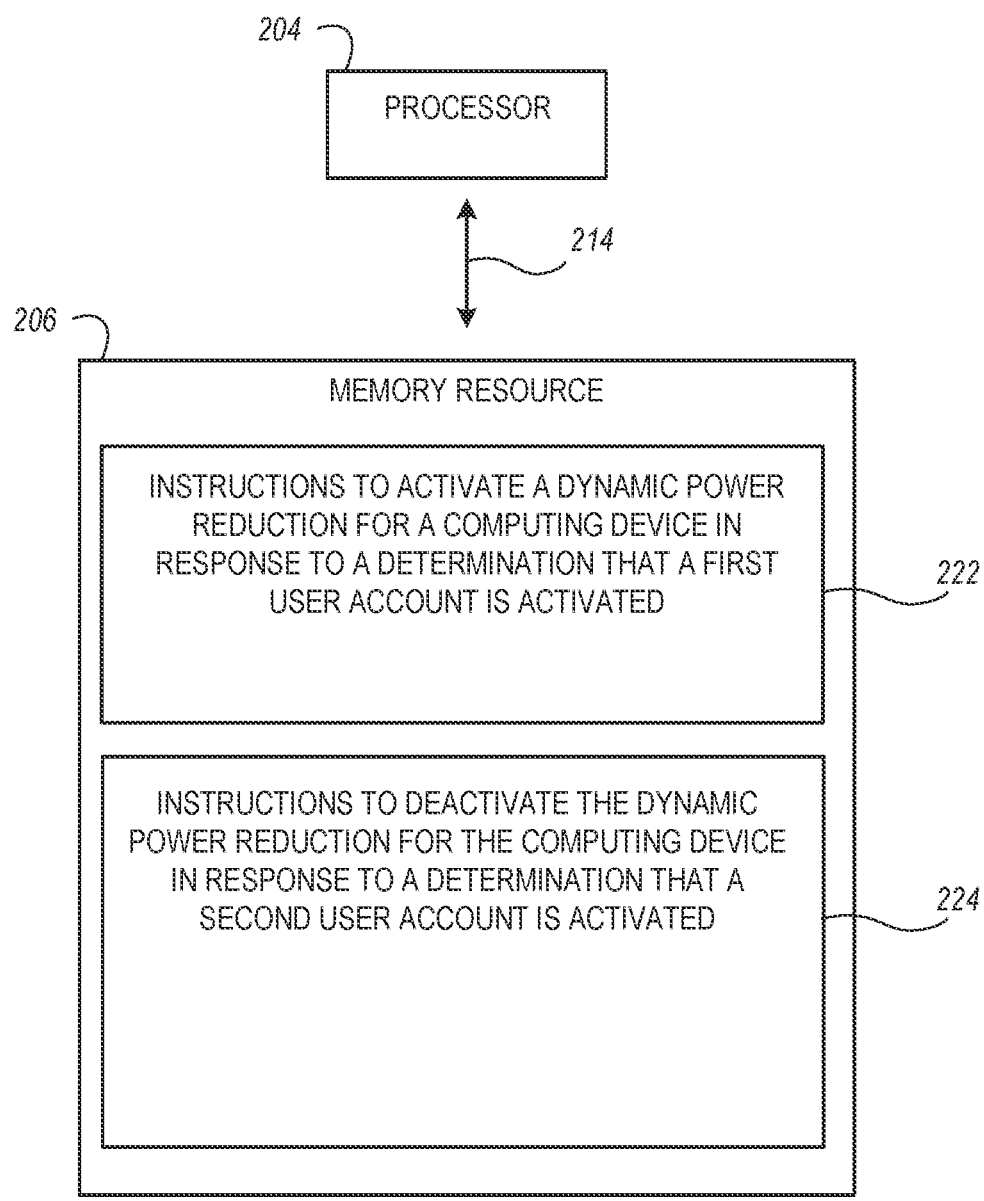
FIG. 2 illustrates an example of a memory resource for altering between power reduction modes.

FIG. 2 illustrates an example of a memory resource 206 for altering between power reduction modes. In some examples, the memory resource 206 can be a part of a computing device or controller that can be communicatively coupled to a computing system. For example, the memory resource 206 can be part of a device 102 as referenced in FIG. 1. In some examples, the memory resource 206 can be communicatively coupled to a processor 204 that can execute instructions 222, 224, stored on the memory resource 206. For example, the memory resource 206 can be communicatively coupled to the processor 204 through a communication path 214. In some examples, a communication path 214 can include a wired or wireless connection that can allow communication between devices and/or components within a single device.

The memory resource 206 may be electronic, magnetic, optical, or other physical storage device that stores executable instructions. Thus, a non-transitory machine-readable medium (MRM) (e.g., a memory resource 206) may be, for example, a non-transitory MRM comprising Random-Access Memory (RAM), read-only memory (ROM), an Electrically-Erasable Programmable ROM (EEPROM), a storage drive, an optical disc, and the like. The non-transitory machine-readable medium (e.g., a memory resource 206) may be disposed within a controller and/or computing device. In this example, the executable instructions 222, 224, can be "installed" on the device. Additionally, and/or alternatively, the non-transitory machine-readable medium (e.g., a memory resource) can be a portable, external or remote storage medium, for example, that allows a computing system to download the instructions 222, 224, from the portable/external/remote storage medium. In this situation, the executable instructions may be part of an "installation package". As described herein, the non-transitory machine-readable medium (e.g., a memory resource 206) can be encoded with executable instructions for altering a dynamic power reduction mode of a radio.

In some examples, the memory resource 206 can include instructions to determine when a network radio is activated by a computing device. In some examples, the computing device can utilize a radio to generate and/or receive wireless radio signals that can be transmitted to communicate with a network and/or remote devices. In some examples, the network radio can be determined to be activated when electrical power is provided to the radio. In other examples, the radio can be determined to be activated when the radio is transmitting or receiving radio waves. In this way, the instructions can be utilized to determine when the network radio is transmitting or receiving radio waves, which can be detrimental to human users under particular conditions (e.g., within a proximity of the computing device, etc.).

The instructions 222, when executed by a processor such as the processor 204, can include instructions to activate a dynamic power reduction for a computing device in response to a determination that a first user account is activated. In some examples, the first user account is associated with a local user of the computing device. As described herein, the first user account can be associated with a first SIM account associated with a human user. In some examples, activating the dynamic power reduction for the device can include altering a power of radio waves generated by the radio. In this way, the dynamic power reduction can lower an SAR risk associated with radio waves generated by the radio.

The determination that the computing device is in the user mode or utilizing the first user account can be based on a power state of the computing device. In other examples, the determination that the computing device is in the user mode can be made based on a plurality of interactions with the computing device. For example, a user can be interacting with a user interface of the computing device. In this example, the user interface can be an application or set of instructions that can allow a human user to interface with a computing device (e.g., provide commands, view results, make selections, etc.). In some examples, the instructions can determine when the user is utilizing the user interface of the computing device and determine that the computing device is in the user mode.

The instructions 224, when executed by a processor such as the processor 204, can include instructions to deactivate the dynamic power reduction for the computing device in response to a determination that a second user account is activated. In some examples, the second user account is associated with a remote management device that utilizes a network radio of the computing device to access performance data associated with the computing device. As described herein, the second user account can correspond to an IoT mode of the computing device where the computing device is utilized as an IoT device by the remote management device and/or IoT network of IoT devices.

In these examples, the IoT mode can correspond to a separate and distinct SIM account than the user mode. In this way, the computing device can include an IoT SIM account and a user SIM account. As described herein, the IoT mode can be activated when the computing device is in a particular power state. For example, the IoT mode can be activated when the computing device is in one of a plurality of sleep states, which can indicate that a user is not utilizing the computing device.

In some examples, the remote management device, utilizing the radio, can access the computing device to access performance data associated with the computing device. As described herein, the dynamic power reduction for the computing device can lower a power of the radio to lower an SAR risk associated with the radio waves generated by the radio. In some examples, when it is determined that a user is not utilizing the computing device, the dynamic power reduction can be deactivated to allow the remote management device to utilize the network radio to communicate with the computing device. In this way, a relatively higher power radio signal can be generated by the network radio when the remote management device is communicating with the computing device.

Figure 3:
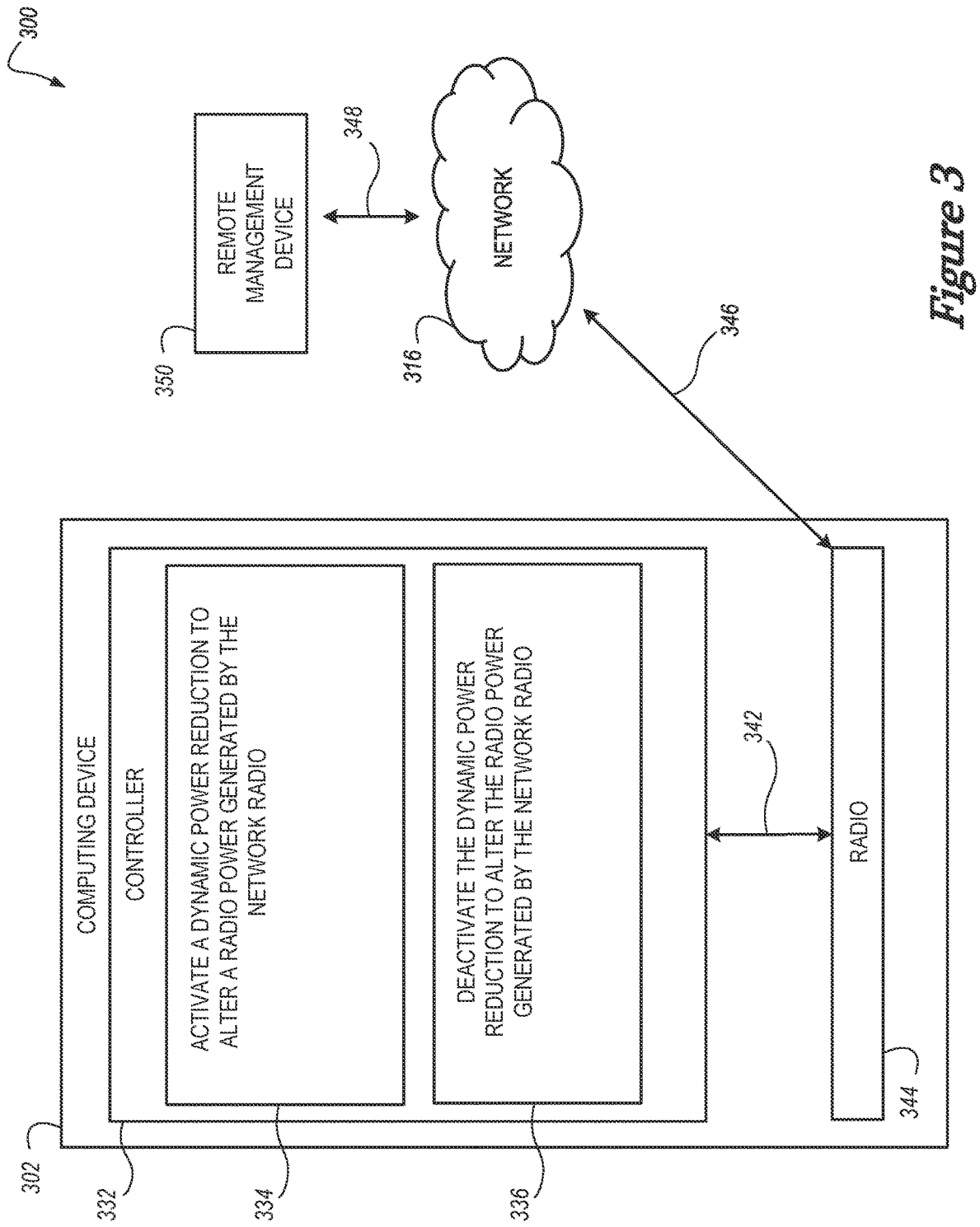
FIG. 3 illustrates an example of a system for altering between power reduction modes of a radio.

FIG. 3 illustrates an example of a system 300 for altering between power reduction modes of a radio 344. In some examples the computing device 302 can be a device that includes a processor 304 communicatively coupled to a memory resource 306. As described herein, the memory resource 306 can include or store instructions 334, 336 that can be executed by the processor 304 to perform particular functions.

In some examples, the computing device 302 can include a radio 344 that can wirelessly communicate with a network 316 through a communication path 346 that can be generated through radio waves. As described herein, the radio waves of the radio 344 can be communicatively coupled to a network 316 through the communication path 346. In some examples, the network 316 can be communicatively coupled to a remote management device 350 through a communication path 348. As described herein, the remote management device 350 can communicate with the radio 344 through the network 316 to extract data and/or receive data from the radio 344 when the computing device 302 is in an IoT mode.

In some examples, the computing device 302 can include instructions that can be executed by a processor 304 to determine when the network radio 344 is performing an upload operation for the computing device 302. In some examples, the radio 344 can perform an upload operation when the computing device 302 is being utilized by a user of the computing device 302. In some examples, upload operations can occur when the user is utilizing the computing device 302. For example, an upload operation can include an operation where the computing device 302 transfers data to a remote computing device 302. In some examples, the upload operation can indicate that a user is utilizing the computing device 302 to communicate with remote computing devices.

In some examples, the computing device 302 can include instructions 334 that can be executed by a processor 304 to activate a dynamic power reduction to alter a radio power generated by the network radio 344 in response to the network radio 344 performing a quantity of upload operations that is above a threshold for upload operations. As described herein, the network radio 344 can perform an upload operation in response to a selection by a human user. In this way, the indication of a particular quantity of upload operations can indicate that the computing device 302 is in a user mode (e.g., being utilized by a user, etc.).

As described herein, activating the dynamic power reduction for the computing device 302 can lower a power of the network radio 344 such that the radio waves generated by the network radio 344 are less harmful to human users that are proximate to the computing device 302. In some examples, activating the dynamic power reduction can alter the power of the network radio 344 based on a dynamic power reduction chart where a particular power level for the network radio 344 can be applied or allowed based on a number of factors. For example, the dynamic power reduction can alter the power of the network radio 344 based on usage of the computing device 302 and/or determined proximity of the user utilizing the computing device 302.

In some examples, the computing device 302 can include instructions that can be executed by a processor 304 to determine when the network radio 344 is below a threshold for upload operations. In some examples, the threshold for upload operations can be utilized to indicate when a user is not utilizing the computing device 302 and/or when the user is not utilizing the network radio 344. For example, the quantity of upload operations can be utilized to determine an activity associated with the computing device 302. In this example, a relatively high quantity of upload operations can indicate that a user is utilizing the computing device 302 and/or utilizing the network radio 344 with a high level of frequency. In this example, a relatively low quantity of operations can indicate that the user is not utilizing the computing device 302 and/or utilizing the network radio 344 with a low level of frequency. In some examples, the computing device 302 can determine that the network radio 344 and/or computing device 302 are in an IoT mode when the network radio 344 is below the threshold for upload operations.

In some examples, the computing device 302 can include instructions 336 that can be executed by a processor 304 to deactivate the dynamic power reduction to alter the radio power generated by the network radio 344 in response to determining the network radio 344 is below the threshold for upload operations. In some examples, the network radio 344 uploading operations that are below the threshold can indicate that the computing device 302 is to activate the IoT mode such that a remote management device 350 can utilized the computing device 302 as an IoT device.

In some examples, the computing device 302 can deactivate the dynamic power reduction for the network radio 344 when the computing device 302 is in the IoT mode. As described herein, the IoT mode can allow the computing device 302 to be utilized as an IoT device with a remote management device 350. In some examples, the IoT mode can indicate that the network radio 344 is at a relatively low utilization. In these examples, the dynamic power reduction may not be needed to lower the SAR to a user since the user may not be proximate to the computing device 302. In this way, the IoT mode can have a higher power level for the network radio 344 than the user mode.

In some examples, the computing device 302 can provide performance data to the remote management device 350. In these examples, the power to be utilized by the network radio 344 can be a known quantity of power for providing the performance data to the remote management device 350. In these examples, the computing device 302 can utilize the known quantity of power to be utilized by the network radio 344 to determine the power reduction of the network radio 344 during the communication with the remote management device 350. In this way, the state of the dynamic power reduction can be based on the performance metrics associated with the IoT interaction of the computing device 302 during the IoT mode.

Figure 4:
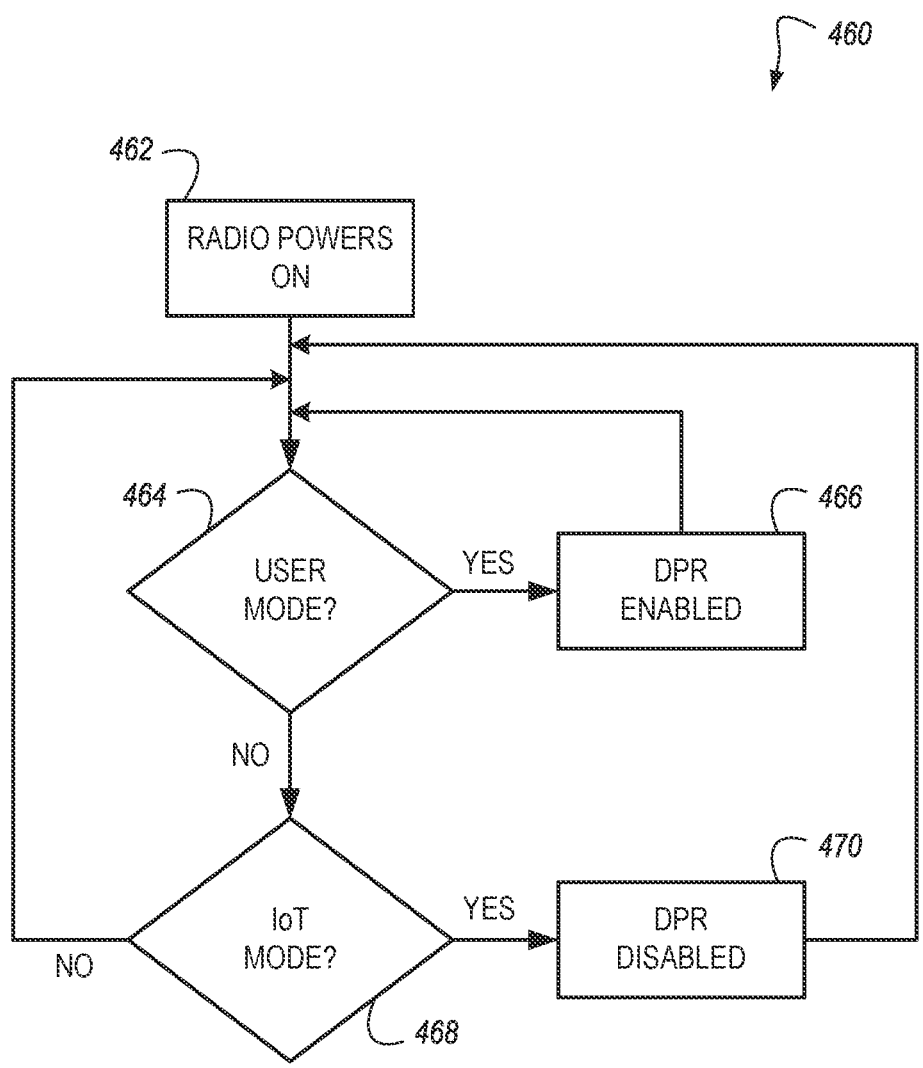
FIG. 4 illustrates an example of a method for altering between power reduction modes of a radio.

FIG. 4 illustrates an example of a method 460 for altering between power reduction modes of a radio. In some examples, the method 460 can be executed by a controller or computing device communicatively coupled to a network radio. In some examples, the method 460 can begin by determining that the network radio is activated at 462. For example, at 462 the method 460 can include determining that the radio power is "on". In some examples, the radio power can be "on" when electrical power is provided to the network radio.

When it is determined that the radio power is "on" or activated, the method 460 can move to 464. At 464, the method can determine if the computing device is in a user mode. As described herein, the user mode can be determined based on whether a human user is interacting with the computing device. In some examples, the method 460 can determine whether a user is interacting with a user interface associated with the computing device. In other examples, the method 460 can determine a quantity of uploads and/or a quantity of downloads to determine when a user is utilizing the computing device.

When it is determined that the computing device is in a user mode at 464, the method 460 can move to 466 to enable the dynamic power reduction (DPR) for the computing device. As described herein, the dynamic power reduction can alter the power of the radio of the computing device to a relatively lower power to mitigate harmful radio waves on users generated by the radio. In some examples, the dynamic power reduction can be enabled or activated and the method 460 can return to determine whether the computing device is in a user mode at 464.

When it is determined that the computing device is not in a user mode at 464, the method 460 can move to 468 to determine if the computing device is in an internet of things (IoT) mode. As described herein, the computing device can be determined to be in an IoT mode when the computing device is not being utilized by a user and/or have a quantity of uploads or downloads that are below a threshold. In this way, the method 460 can determine that a user may not be proximate to the computing device. In other examples, the method 460 can determine that the radio is being utilized to upload data as an IoT device for a remote management device. For example, the computing device can be uploading performance information associated with the computing device to a remote management device and determined to be in an IoT mode.

When it is determined that the computing device is in an IoT mode at 468, the method 460 can move to 470 to disable the dynamic power reduction or alter the dynamic power reduction level or profile. In some examples, the IoT mode is associated with uploading or providing data to a remote management device as an IoT device associated with the remote management device. In this way, the dynamic power reduction can be disabled such that the performance data can be provided to the remote management device while the DPR is disabled. In some examples, the dynamic power reduction can be disabled since the power utilized by the radio can be determined prior to providing the performance data to the remote management device. For example, the power utilized can during the IoT mode can be predictable since the data upload can be during a similar time and/or quantity of data.

In some examples, the method 460 can be restarted when the dynamic power reduction is enabled at 466 and/or restarted when the dynamic power reduction is disabled at 470. In this way, the method 460 can be dynamic while the radio power is "on". In this way, the dynamic power reduction can be altered dynamically as the computing device alters between the user mode and the IoT mode.

Figure 5:
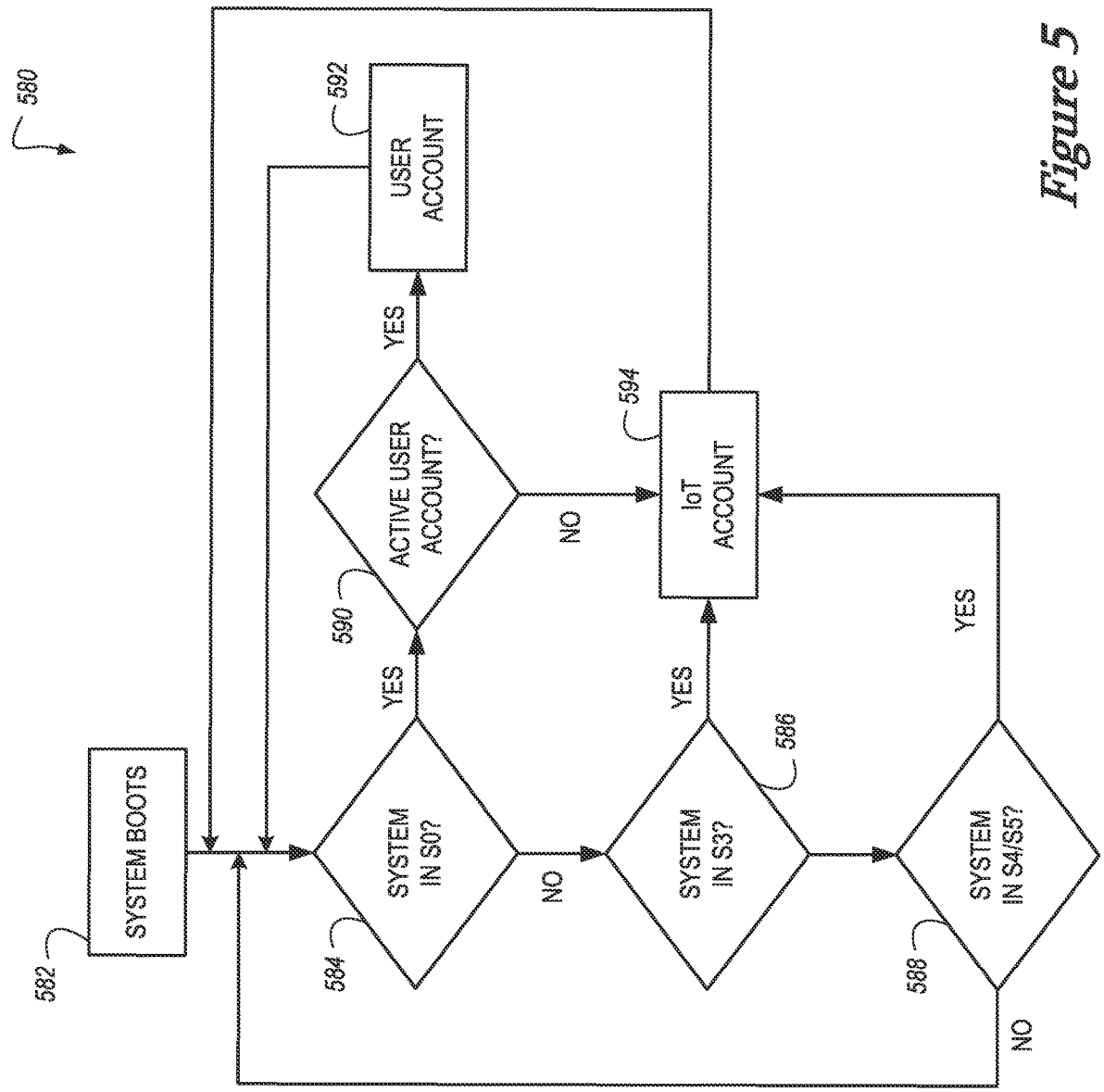
FIG. 5 illustrates an example of a method for altering between account modes of a device.

FIG. 5 illustrates an example of a method 580 for altering between account modes of a device. As described herein, the method 580 can include instructions that can be executed by a computing device. For example, the method 580 can include a plurality of instructions that can be stored on a memory resource and executed by a processor. In some examples, the method 580 can be utilized to alter between a first SIM account (e.g., user account 592) and a second SIM account (e.g., IoT account 594). As described herein, the method 580 can alter between the first SIM account and the second SIM account based on a power state of a computing device.

In some examples, the method 580 can start with a system boot at 582. Booting the system can include executing a boot operation on a computing device to activate an operating system of the computing device. In some examples, the boot operation can include starting the computing device or providing electrical power to the components of the computing device (e.g., processor, processing resource, memory resource, etc.) such that the computing device can execute instructions.

At 584, the method 580 can determine if the computing device is in a "S0" power state. In some examples, the S0 power state can be referred to a s a working state. The working state of the computing device can indicate that operations are being performed in response to interactions with the computing device. In some examples, the S0 power state can be a full on power state or normal power state for the computing device to interact with a user of the computing device.

When the method 580 determines that the computing device is in the S0 power state the method 580 can move to 590 to determine if there is an active user account. In some examples, determining if there is an active user account can include determining a quantity of upload operations being performed by the computing device. As described herein, the quantity of upload operations can indicate when a human user is interacting with the computing device. In other examples, determining when there is an active user account can include determining when a user is logged on to a user profile of the computing device. In this way, the combination of determining the system is in the S0 power state and the user is logged into a user account of the computing can be utilized to determine when the method 580 puts the computing device in the user account 592 or the SIM account associated with a particular user of the computing device.

When the method 580 determines the computing device is not in the S0 power state, the method 580 can move to 586 to determine if the computing device is in the S3 power state. As used herein, the S3 power state can be one of a plurality of sleep states of the computing device. For example, the S3 power state can be a low wake latency sleeping state of the computing device. In a specific example, the S3 power state can refer to a sleeping state of the computing device when the CPU and/or system cache context is lost. In these examples, the method 580 can activate or alter the SIM account to the IoT account 594 when the method 580 determines the computing device is in the S3 power state at 586. In some examples, the method 580 can move to 588 to determine if the computing device is in the S4 or S5 power state when the computing device is not in the S3 power state at 586.

The S4 or S5 power state can be a lowest power state for the computing device. In some examples, the S4 or S5 power state can be a suspend to disk power state. In some examples, the S4 or S5 power state can have a relatively long wake latency compared to the other sleep states of the computing device. In some examples, the S4 or S5 power state can power off hardware platform devices such that electrical power is not provided to the hardware platform devices. In some examples, the platform context can be maintained during the S4 or S5 power states. When the method 580 determines that the computing device is not in the S4 or S5 power state, the method 580 can return to 584 to determine if the computing device is in the S0 power state.

When the method 580 determines the computing device is in the S4 or S5 power state, the method 580 can activate the IoT account 594 and/or SIM account associated with the IoT account 594. As described herein, the IoT account 594 can be a separate SIM account from the user account 592. In some examples, the IoT account 594 can utilize the same radio as the user account 592. In these examples, a remote management device can utilize the computing device as an IoT device when the computing device is utilizing the IoT account 594.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure. Further, as used herein, "a" refers to one such thing or more than one such thing.

The figures herein follow a numbering convention in which the first digit corresponds to the drawing figure number and the remaining digits identify an element or component in the drawing. For example, reference numeral 102 may refer to element 102 in FIG. 1 and an analogous element may be identified by reference numeral 302 in FIG. 3. Elements shown in the various figures herein can be added, exchanged, and/or eliminated to provide additional examples of the disclosure. In addition, the proportion and the relative scale of the elements provided in the figures are intended to illustrate the examples of the disclosure, and should not be taken in a limiting sense.

It can be understood that when an element is referred to as being "on," "connected to", "coupled to", or "coupled with" another element, it can be directly on, connected, or coupled with the other element or intervening elements may be present. In contrast, when an object is "directly coupled to" or "directly coupled with" another element it is understood that are no intervening elements (adhesives, screws, other elements) etc.

The above specification, examples, and data provide a description of the system and methods of the disclosure. Since many examples can be made without departing from the spirit and scope of the system and method of the disclosure, this specification merely sets forth some of the many possible example configurations and implementations.

What is claimed is:

1. A device, comprising:
a processor; and
a non-transitory memory resource storing machine-readable instructions stored thereon that, when executed, cause the processor to:
activate a dynamic power reduction mode for a device in response to identifying the device is in a first power state associated with a first account; and
deactivate the dynamic power reduction mode for the device in response to identifying the device is in a second power state associated with a second account, wherein the second account is associated with a remote management device that utilizes the device as an internet of things (IoT) device to access performance metric data stored by the device.

2. The device of claim 1, wherein the first account is a first subscriber identification module (SIM) account associated with the device and the second account is a second SIM account associated with the device.

3. The device of claim 1, wherein the first power state is a working state of the device and the second power state is a low-power state of the device.

4. The device of claim 1, wherein the processor is to activate the first account in response to a determination that the device is in the first power state and to activate the second account in response to a determination that the device is in the second power state.

5. The device of claim 1, wherein the processor is to activate the first account in response to a determination that a radio associated with the device has transmitted a particular quantity of uploads for a period of time.

6. The device of claim 1, wherein the processor is to activate the second account in response to a determination that a radio associated with the device is predicted to transmit a quantity of uploads that is below a threshold quantity of uploads for a period of time.

7. A non-transitory memory resource storing machine-readable instructions stored thereon that, when executed, cause a processor of a computing device to:
activate a dynamic power reduction for the computing device in response to a determination that a first user account is activated, wherein the first user account is associated with a local user of the computing device; and
deactivate the dynamic power reduction for the computing device in response to a
determination that a second user account is activated, wherein the second user account is associated with a remote management device that utilizes a network radio of the computing device to access performance data associated with the computing device,
wherein the processor is to activate an internet of things (IoT) mode when the second user account is activated, wherein the IoT mode allows the computing device to interact with an IoT network.

8. The memory resource of claim 7, wherein the processor is to activate the dynamic power reduction for the computing device in response to the computing device activating a working power state.

9. The memory resource of claim 7, wherein the dynamic power reduction includes instructions to alter a radio frequency generated by the network radio.

* * * * *